Aug. 5, 1941.    F. C. VEITH    2,251,507
STOCK WATERING DEVICE
Filed Nov. 21, 1939
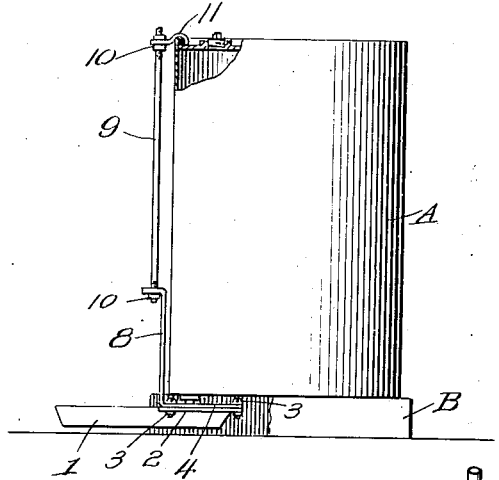
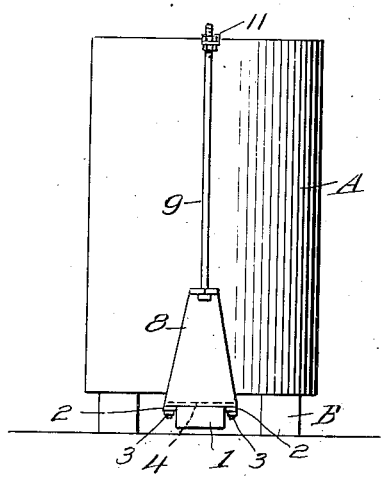
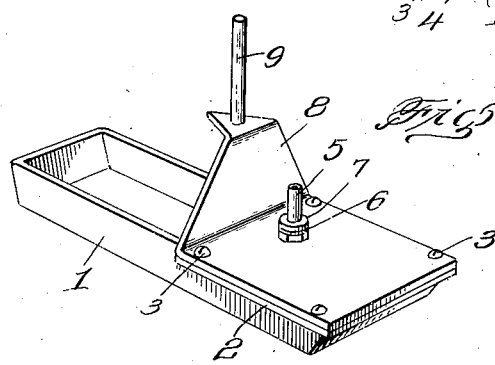
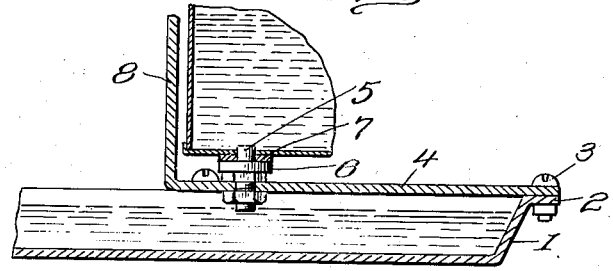
Ferdinand C. Veith.
INVENTOR
BY Victor J. Evans & Co.
ATTORNEYS
WITNESS Patented Aug. 5, 1941

2,251,507

UNITED STATES PATENT OFFICE 2,251,507

STOCK WATERING DEVICE

Ferdinand C. Veith, Upper Sandusky, Ohio

Application November 21, 1939, Serial No. 305,533

1 Claim. (Cl. 119—77)

This invention relates to automatic watering devices for stock and the like, and its general object is to provide a device of the fountain type, in the form of an attachment, that is primarily designed to be detachably connected to an ordinary drum, barrel or like container which acts as a reservoir to hold and supply water to the device, as it is used from the trough thereof, so that a substantially constant water level is maintained in the trough until the supply within the reservoir has become exhausted.

A further object is to provide an automatic watering device that can be easily and expeditiously applied and removed with respect to a container, such as the drum shown, and the device is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:

Figure 1 is a side elevation of my device attached to a drum, with parts broken away and in section.

Figure 2 is a front view thereof.

Figure 3 is a fragmentary perspective view illustrating the trough and the inlet means of the device, for the passage of water to the trough.

Figure 4 is an enlarged fragmentary sectional view taken through the device attached to the drum.

Referring to the drawing in detail, it will be noted that my device is shown as being attached to a drum A of the type generally commercially used for oil, but it can be attached to a barrel or any other container of sufficient size to hold a large quantity of water, providing the container can be made airtight. In any event, the drum shown is provided with an outlet opening in its bottom, and preferably has an inlet opening in its top, the inlet opening having an airtight closure and of course being for the purpose of filling the drum. However, the drum can be filled through the outlet opening, providing of course the device is removed from the drum and the latter is turned upside down. The drum is shown as being supported upon a pair of spaced base members B, but it can be supported upon sled runners or the like to facilitate moving the drum, as will be apparent.

The device includes an elongated rectangular trough 1 having side and end walls, and one end wall, as well as a portion of the side walls are provided with an outwardly directed horizontally disposed flange 2 having openings therein for receiving the bolts of bolt and nut connections 3 for securing a cover plate 4 to the flanged portion of the trough, as clearly shown in Figure 3.

Extending through an opening in the cover plate is a nipple or short pipe section 5 that is secured thereto by nuts bearing against the upper and lower surfaces thereof, as best shown in Figure 4. Mounted on the upper nut is a washer 6 and upon the washer is a gasket 7, to provide a leakproof connection between the bottom of the drum and the nipple 5, when the latter is disposed within the outlet opening, for the passage of water from the drum and into the trough through the medium of the nipple, as will be apparent upon inspection of Figure 4.

The device is detachably secured to the drum for clamping association therewith, so that the gasket sets up a pressure against the bottom of the drum to assure a leakproof connection, and for that purpose the cover plate has formed thereon a substantially triangular shaped extension 8 rising from the inner end thereof and with its apex portion bent at right angles to its remaining portion for disposal in a horizontal plane as best shown in Figure 3. The bent portion has an opening therein through which extends the lower end of a rod-like bolt 9 that may have a head on its lower end, but is shown as having a nut threaded thereon for engagement with the underside of the bent portion, and the opposite or upper end of the bolt is threaded to receive lock nuts 10 for adjustably securing the hooked free end of a clamping lug 11 to the upper flange of the drum, as clearly shown in Figure 1.

From the above description and disclosure in the drawing, it is believed that the operation of my device is obvious, but it might be mentioned that water will flow from the drum into the trough at any time the water level within the trough is below the lower end of the nipple 5, assuming of course, that the drum has water therein, as when the water level within the trough is below the nipple, it will be obvious that air will pass within the drum through the nipple, and thereby increase the volume of air above the water within the drum. However, when the water level within the trough reaches a height to close the nipple, air will be excluded and the passage of water will be stopped, due to the fact, that the pressure of atmospheric air is greater than that of the air within the drum, with the result, it will be seen that the water within the trough is replenished as it is used, and a substantially constant water level is maintained, until the supply within the drum has become exhausted.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:

An automatic watering device for use with an airtight container that provides a reservoir therefor, said container having an outlet opening in the bottom thereof, and said device comprising an elongated rectangular trough having side and end walls, an outwardly directed flange formed along the length of one end wall and a portion of the length of the side walls, a cover plate for the flanged portion of the trough and resting upon and secured to the flange, a nipple secured to and extending through the plate for disposal within the trough and within the outlet opening for the passage of water from the container to the trough, a gasket surrounding the nipple and having the container mounted thereon to provide a leakproof connection between the container and nipple, a substantially triangular shaped upright extension formed on the inner end of the plate and having its upper apex end portion bent for disposal in a horizontal plane, a clamping lug for disposal about the upper edge of the container, and a rod bolt secured to and arranged between the apex end portion and the clamping lug for detachably securing the trough to the container.

FERDINAND C. VEITH.